Oct. 16, 1962   D. W. HAWK   3,058,558
COUPLING MECHANISM
Filed Sept. 1, 1959   2 Sheets-Sheet 1

INVENTOR
DALE W. HAWK
BY
ATTORNEY

Oct. 16, 1962  D. W. HAWK  3,058,558
COUPLING MECHANISM
Filed Sept. 1, 1959
2 Sheets-Sheet 2

INVENTOR
DALE W. HAWK
BY *James C. Olson*
ATTORNEY

United States Patent Office 3,058,558
Patented Oct. 16, 1962

3,058,558
COUPLING MECHANISM
Dale W. Hawk, Glendale, Ariz., assignor to Allis-Chalmers Manufacturing Company, Milwaukee, Wis.
Filed Sept. 1, 1959, Ser. No. 837,544
2 Claims. (Cl. 192—67)

This invention relates generally to shifter devices for drive transmitting mechanisms and is more particularly concerned with a coupling mechanism adapted to establish and interrupt drive to each of a pair of wheels of a four wheel drive vehicle in order to selectively operate the vehicle either as a four wheel drive unit or as a two wheel drive unit.

Heretofore, various types of gear and collar shifters have been employed in power transmisisons and the like in order to selectively establish and interrupt drive between the various driving and driven members. The usual construction includes a shift rod connected with a shifter fork assembly that is received in the annular groove of either a gear or collar member. The shift rod is then operative to shift the gear or collar member axially into and out of engagement with the various driving and driven members. These conventional shifter devices have been found to be satisfactory for some installations, but not entirely satisfactory for others. For example, conventional shifter forks and collars require linkages that consume a considerable amount of space which is definitely a limiting factor. Also, elaborate interlock and detent mechanisms are usually required in order to prevent accidental shifting of the various shift rods. Accidental shifting under driving conditions may result in serious damage to the drive mechanism.

In designing a coupling mechanism for an individual wheel of a mutliple wheel drive tractor vehicle, one of the biggest obstacles to deal with is the limited space available on the rear axle. Further, a coupling mechanism adapted to be used for this purpose must not only be compact but must also be rugged enough to withstand the severe shock loads to which it may be subjected as the tractor performs a variety of heavy duty work tasks. Additionally, in order to meet the minimum requirements of reliabiilty, the mechanism must be devoid of the unwanted tendency to accidentally disengage under driving conditions.

It is, therefore, an object of the present invention to provide an improved coupling mechanism for connecting a driving and a driven member which will overcome the disadvantages and meet the requirements hereinbefore pointed out in an entirely satisfactory manner.

Another object of the present invention is to provide an improved coupling mechanism which is compact and readily assembled and disassembled and which incorporates a self-locking feature in order to prevent accidental disengagement under driving conditions.

It is another object of the present invention to provide an improved coupling mechanism of the character hereinbefore referred to wherein a crank arrangement is employed to shift an axially shiftable coupling collar thereby minimizing the space requirements for the coupling mechanism.

It is another object of the present invention to provide an improved coupling mechanism which may be readily incorporated into the axle of a vehicle in order to selectively establish drive to a traction wheel and which includes a locking feature to prevent accidental disengagement under driving conditions.

These and other objects and advantages will be apparent to those skilled in the art when the following detailed description is read in conjunction with the appended drawings in which.

Figure 1:
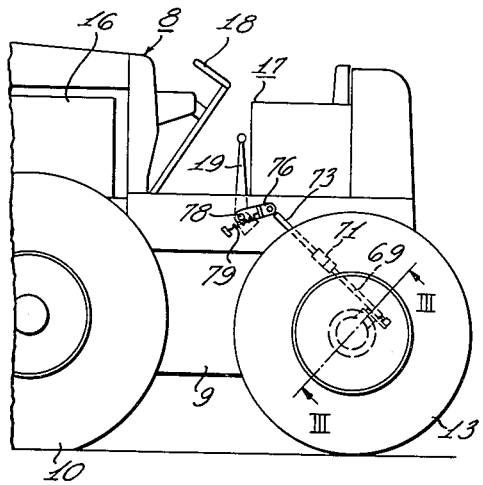
FIG. 1 is a partial side elevation of a four wheel drive tractor vehicle, and shows the location of the hand lever and operating linkage for a pair of coupling mechanisms.
Figure 2:
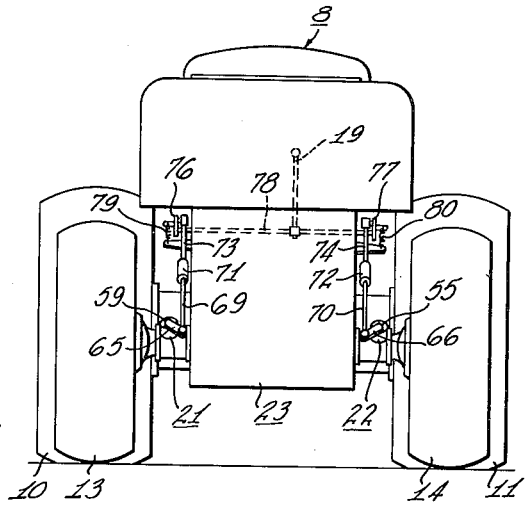
FIG. 2 is a rear view of the tractor vehicle of FIG. 1 and shows the operating linkage and location of the coupling mechanisms on the rear axle.

Referring to FIGS. 1 and 2, a four wheeled, rubber tired, four wheel drive tractor vehicle 8 has been chosen for illustrating a particlular application of this invention; namely, as a drive coupler on the rear axle for shifting the tractor from four wheel drive to two wheel drive or from two wheel drive to four wheel drive.

Tractor 8 includes a main frame 9 which is supported at its front end by means of rubber tired wheels 10 and 11 and at its rear end by steerable rubber tired wheels 13 and 14. Also, an engine 16 is mounted on the forward portion of the main frame 9 and an opeartor's station, indicated generally at 17, is provided at the rear. At the operator's station 17 in addition to the numerous tractor controls, not shown, is a conventional steering wheel 18 and a hand lever 19 for alternatively engaging and disengaging drive to the rear wheels 13 and 14 by selectively manipulating the pair of coupling mechanisms, indicated generally at 21 and 22. The pair of coupling mechanisms 21 and 22 are incorporated into the rear axle assembly, identified generally at 23 adjacent each of the rear wheels. Drive is transmitted to the traction wheels from the engine 16 through a suitable transmission, not shown, to the rear axle assembly 23 and thence through drive gearing, also not shown.

Figure 3:
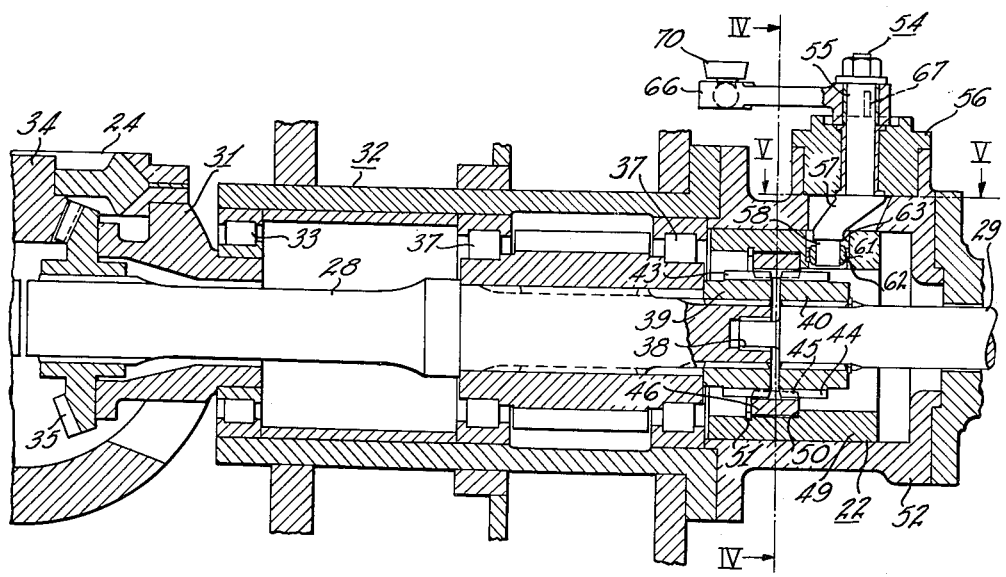
FIG. 3 is a portion of the right half of the rear axle assembly taken along section line III—III in FIG. 1 and shows one of the coupling mechanisms disposed in the engaged or drive position.

Referring to FIG. 3, the portion of the rear axle assembly 23 which is shown includes the right half of the differential 24 and the right half of the axle drive up to but not including the right rear wheel 14. It is to be understood that the drive to wheel 13 is identical and will, therefore, not be described in detail.

Drive is transmitted from the differential to wheel 14 through inner driving axle shaft 28, coupling mechanism 22, driven outer axle shaft 29, the latter being coaxial with shaft 28 and in driving relation to a planetary final drive gear system which is associated with wheel 14 and is not shown. The carrier 31 of the differential is journaled on the rear axle housing 32 by means of bearings 33 and carries a series of planet pinions, one of which is shown at 34, which are in mesh with counter gear 35 which in turn is splined on the inner end of shaft 28. Inner shaft 28 is journaled within axle housing 32 by means of bearings 37. The outer shaft 29 is journaled within axle housing 32 by suitable bearing means, not shown, the inner end of shaft 29 being piloted by inner shaft 28 through pilot bushings 38.

In order to transmit torque from inner shaft 28 to outer shaft 29 coupling mechanism 22 is provided which selectively couples and uncouples the two shafts. Coupling mechanism 22 includes a pair of gearlike coupling members 39 and 40, respectively coaxial with and splined on adjacent ends of shafts 28 and 29. The coupling members 39 and 40 are respectively provided with a series of external splines 43 and 44 which are engageable with the internal splines 45 of the coupling collar 46. Splines 43, 44 and 45 are in effect interengageable clutch teeth. Coupling collar 46, which in effect serves as a coupler, is rotatably carried within a sleeve member 49. A radially inwardly projecting shoulder 50 on the interior of sleeve 49 abuts one axial side of collar 46, and a snap ring 51 associated with the inner periphery of sleeve 49 engages the other axial side of the collar thereby retaining the latter against axial movement with respect to sleeve 49. Sleeve member 49 is axially shiftable and rotatably mounted within a detachable portion 52 of housing 32.

A crank assembly 54 is provided for axially shifting the sleeve member 49 and collar 46 in order to couple and uncouple member 39 with member 40. As shown in FIG. 3, for instance, the coupling collar 46 is in engagement with each of the coupling members 39 and 40 whereby driving torque may be delivered to traction wheel 14.

Figure 4:
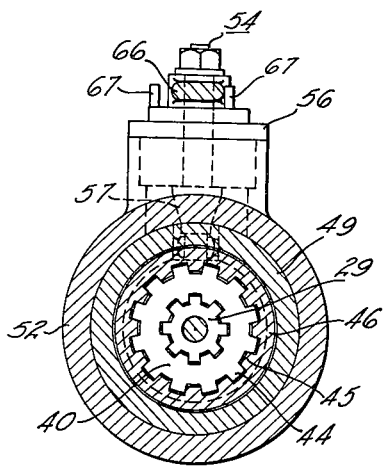
FIG. 4 is a section taken along line IV—IV in FIG. 3.
Figure 5:
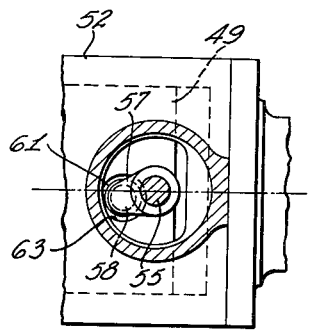
FIG. 5 is a section taken along line V—V in FIG. 3 and shows the near overcenter position of the operating crank when the coupling mechanism is in the engaged position.

Referring to FIGS. 3, 4 and 5, the crank assembly 54 includes a crank shaft 55 journaled by means of suitable bearings mounted in a cap that is detachably set in portion 52 of axle housing 32. The axis of rotation of shaft 55 is perpendicular to and coplanar with the axis of shafts 28 and 29 which also happens to be the axis of sleeve 49, collar 46, and coupling members 39 and 40. A crank arm 57 is integral with shaft 55 and carries a crank pin 58, the latter having an axis parallel to the axis of the crank shaft. The crank pin 58 is swivelly connected to the sleeve 49 through a spherical bushing 61 which is axially slidably carried on pin 58 and is in cooperating engagement with a bushing housing 62 carried in a suitable opening 63 provided in the sleeve member 49. The bushing 61 is similar to a ball and the bushing 62 is similar to a socket, these bushings forming a ball and socket joint. When crank 57 is rotated, the spherical bushing 61 moves outwardly along a curved path forcing sleeve 49 to rotate slightly with respect to collar 46 as the latter is moved axially into or out of the engaged position. This rotary motion of sleeve 49 during shifting and the rotary motion of collar 46 during engagement with members 39 and 40 requires that the coupling collar 46 and sleeve 49 be separate pieces free to rotate with respect to each other.

In the engaged position of the mechanism the swivel connection between pin 58 and sleeve 49 is rotated slightly past an overcenter position with the crank shaft axis and the axis of member 49. In order to shift from the engaged position of FIGS. 3, 4 and 5 to the disengaged position shown in FIGS. 6 and 7 the swivel connection or axis of pin 58 must move toward the center line of the sleeve axis before starting the actual disengaging axial motion. This past overcenter position eliminates the possibility of accidental disengagement of the rear driving wheels 13 and 14 when they are being driven. Also assisting in the prevention of accidental disengagement is the outward thrust acting on the shift collar 46 caused by a slight distortion of the normally straight splines 43, 44 and 45 to a slight helical shape when under heavy torque load.

Referring to FIGS. 1 and 2, the crank shafts 55 and 59 of the coupling mechanisms 21 and 22 are rotated respectively by hand lever 19 acting through a linkage means which engages a pair of arms 65 and 66. Arms 65 and 66 are splined respectively onto the ends of crank shafts 55 and 59 that project outside of the axle housing 32. As best shown in FIG. 4, a pair of stops 67 are carried on cap 56 to limit the arm through which arm 66 and shaft 55 may be rotated, whereby the axial travel of collar 46 is also limited. A similar pair of stops, not shown, are provided for arm 65.

A pair of push-pull rods 69 and 70 are respectively pivotally connected at their one end to arms 65 and 66 and at their other ends to compression spring type energy cells 71 and 72. A second pair of push-pull rods 73 and 74 interconnect the energy cells 71 and 72 with a pair of lever arms 76 and 77 which in turn are keyed on a rock shaft 78. Shaft 78 is suitably journaled on the tractor main frame and carries manual control lever 19 which is keyed thereon near the center and is operative to rotate shaft 78 in one direction to the engaged or four wheel drive position and in the opposite direction to the disengaged or two wheel drive position. A pair of overcenter springs 79 and 80 connect each of lever arms 76 and 77 with the main frame 9 so that the hand lever 19 will be retained in either one of these two positions and will not remain in an intermediate position unless held there by some external force.

The purpose of the energy cells 71 and 72 will be apparent considering that as the coupling mechanisms 21 and 22 are shifted from an engaged to a disengaged position or vice versa, one or both of the coupling collars may be temporarily restrained from completing the shifting motion. This could be caused by misalignment of the splines of the driving and driven coupling members and the coupling collar or simply by friction forces engendered due to the driving torque being transmitted through the collars. In order for the operator to rapidly complete the hand lever shift movement without waiting for relief from such restrictions, the energy cells will either permit extension or contraction of either one or both of the push-pull rods, thereby storing the mechanical energy, as by compressing a compression spring. As soon as the restraints are relieved, the energy of the compression spring will be released and coupling collars will complete their movement. The details of this type of energy storage cell are well known and have, therefore, not been described in detail.

Figure 7:
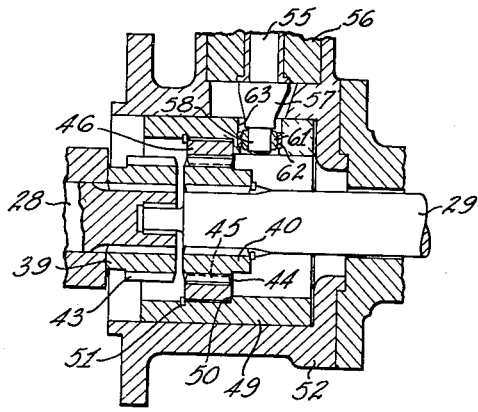
FIG.7 is a section taken along line VII—VII in FIG. 6.
Figure 6:
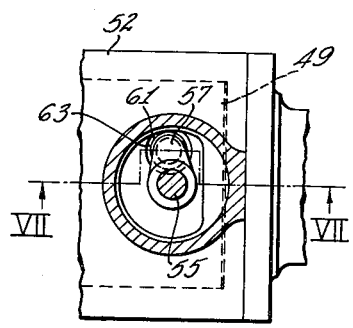
FIG. 6 is similar to the view in FIG. 5 with the operating crank rotated to disengage the coupling mechanism.

Referring to FIGS. 6 and 7, the coupling mechanism is shown in the disengaged position, the crank shaft and crank arm having been rotated clockwise from the position of FIG. 5 to the position of FIG. 7; and the internal splines 45 of coupling collar 46 are disposed in slidable engagement with only the external splines 44 of driven coupling member 40.

*Operation*

As long as the coupling mechanisms remain in the engaged position, as shown in FIGS. 1 through 5, inner axle 28 will be coupled with outer axle 29; and tractor 8 will operate as a four wheel drive unit. As is well known, four wheel drive is desirable when maximum tractive effort is required. However, under high speed and lower tractive requirements four wheel drive is no longer necessary. Accordingly, manual lever 19 may be rotated forwardly or counterclockwise, as viewed in FIG. 1, thereby rotating lever arms 76 and 77 counterclockwise placing tension in the push-pull rods and energy cells and rotating arms 65 and 66 clockwise and counterclockwise, as viewed in FIG. 2. The crank shafts 55 and 59 are thus caused to be rotated clockwise and counterclockwise respectively, and the swivel connection between pin 58 and sleeve 49 will be rotated past the overcenter position rotating sleeve 49 and moving the coupling collar 46 axially out of engagement with the driving member 39. Thus, drive from inner axle 28 to the outer axle 29 is interrupted; and tractor 8 is converted from a four wheel drive high tractive unit to a two wheel drive high speed unit.

From the foregoing detailed description it will be apparent that a new and useful coupling means has been illustrated which is particularly adaptable for coupling and uncoupling drive to the rear wheels of a four wheel tractor in order to convert the latter from four wheel drive to two wheel drive, or from two wheel drive to four wheel drive. The coupling mechanisms are compact; require a minimum amount of space on the tractor's rear axle housing; and may readily be assembled and disassembled. These units are entirely reliable and are simple in construction, thereby minimizing the overall cost of manufacture.

Although only one embodiment of this invention has been described in detail, it is not intended to limit any patent granted hereon to the specific details disclosed. For instance, others skilled in the art upon examination of the present invention may devise other means for actuating the crank assembly in order to shift the sleeve and coupling collar axially without deviating from the spirit of this invention.

What is claimed is:

1. A coupling means for selectively connecting two members rotatably associated with a support comprising: a collar coaxially and slidably carried on and rotatable with one of said members; cooperating clutch teeth formed respectively on the other of the members and said collar; and means for alternatively shifting said collar into and out of engagement with said other of the members including a sleeve rotatably and axially slidably mounted on said support in coaxial relation to said collar, means for retaining said collar in axially fixed and relatively rotatable relationship with said sleeve, a crank shaft rotatable on an axis perpendicular to the longitudinal axis of said sleeve, a crank arm fixed at one end to said crank shaft and at the opposite end swivelly connected to said sleeve whereby rocking movement of said crank shaft imparts axial movement to said collar.

2. The combination set forth in claim 1 wherein said rotatable members are coaxially aligned with said collar, the latter being provided with internal clutch teeth interengageable with external clutch teeth respectively on said two members and wherein said collar is carried axially within said sleeve.

References Cited in the file of this patent

UNITED STATES PATENTS

| | | |
|---|---|---|
| 1,243,720 | Eidson et al. | Oct. 23, 1917 |
| 1,345,633 | Pyle | July 6, 1920 |
| 1,566,924 | Robertson | Dec. 22, 1925 |
| 1,865,022 | Larson | June 28, 1932 |
| 2,444,227 | Hasbrouck | June 29, 1948 |
| 2,515,114 | Chilton | July 11, 1950 |
| 2,584,032 | Lapsley | Jan. 29, 1952 |
| 2,630,872 | Roos et al. | Mar. 10, 1953 |
| 2,785,783 | Homrig et al. | Mar. 19, 1957 |
| 2,820,538 | Parrett | Jan. 21, 1958 |
| 2,850,130 | Mater | Sept. 2, 1958 |